United States Patent Office 3,240,778
Patented Mar. 15, 1966

3,240,778
11,12-DIHYDROXY STEROIDS OF THE PREGNANE SERIES AND ACETALS AND KETALS THEREOF
Patrick A. Diassi, Westfield, N.J., assignor, by mesne assignments, to E. R. Squibb & Sons, Inc., New York, N.Y., a corporation of Delaware
No Drawing. Filed July 13, 1964, Ser. No. 382,344
18 Claims. (Cl. 260—239.55)

This application is a continuation-in-part of my application, Serial No. 363,993, filed April 30, 1964, now abandoned.

This invention relates to and has as its objects the provision of novel physiologically active steroids, methods for preparing the same and new intermediates in said preparation.

The final products of this invention are of the formulae:

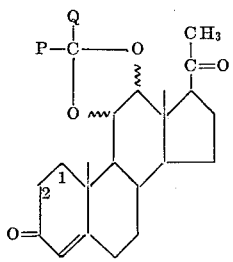
and
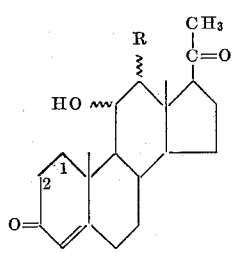

wherein the 1,2-position is saturated or double-bonded, the curvy lines indicate that the oxygen containing radical is in either the alpha or beta position, R is hydroxy or α-acyloxy (preferably the acyloxy radical of a hydrocarbon carboxylic acid of less than twelve carbon atoms) P is hydrogen, lower alkyl, halo lower alkyl, carboxy lower alkyl (or a salt or ester thereof), monocyclic cycloalkyl, monocyclic aryl, monocyclic aryl lower alkyl, monocyclic heterocyclic or monocyclic heterocyclic lower alkyl, and Q is lower alkyl, halo lower alkyl, carboxy lower alkyl (or a salt or ester thereof), monocyclic cycloalkyl, monocyclic aryl, monocyclic aryl lower alkyl, monocyclic heterocyclic or monocyclic heterocyclic lower alkyl, or together with the carbon atom to which they are joined P and Q are cycloalkyl or monocyclic heterocyclic. Particularly preferred are those compounds wherein P is lower alkyl and Q is lower alkyl or monocyclic aryl.

The final compounds of this invention are physiologically active steroids which possess progestational activity and thus can be employed instead of progestational agents, such as progesterone, for example, in the treatment of habitual abortion, for which purpose they can be administered in the same manner as progesterone, for example, with the dosage adjusted for the relative potency of the particular steroid.

The novel products of this invention are prepared by the processes of this invention which entail a number of steps starting with a 3,20-bis-ketal of 9α-fluoro-11-ketoprogesterone, such as the 3,20-bis-ethylene ketal. The steps of the process may be represented by the following equations, wherein R, P and Q are as hereinbefore defined, and A is preferably a lower alkylene radical, such as ethylene, propylene-1,2, and trimethylene:

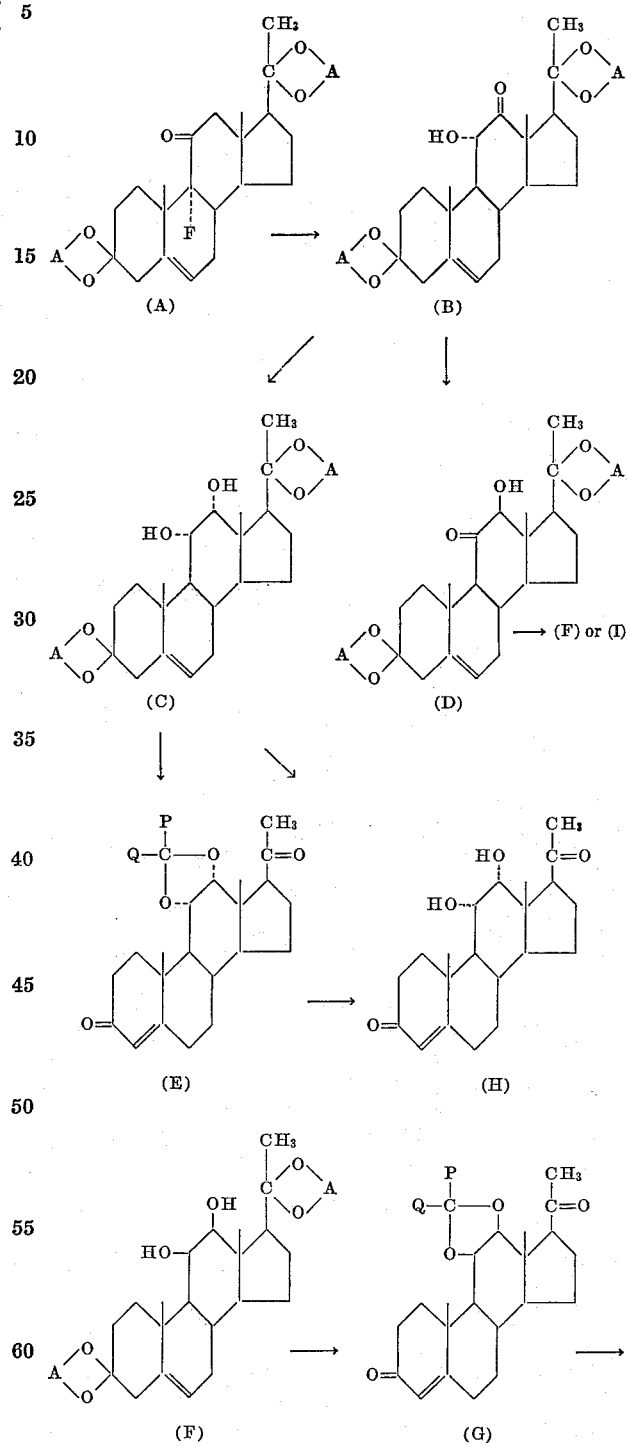

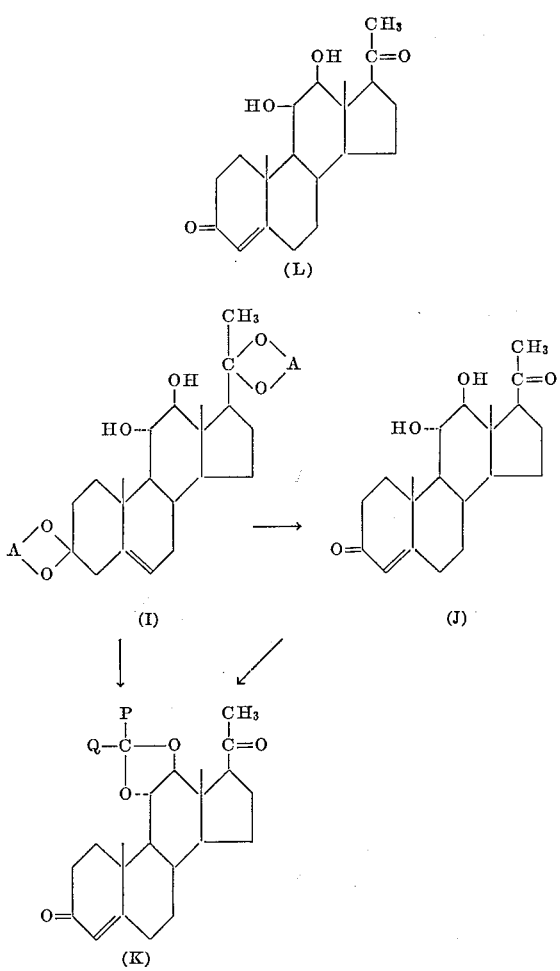

In accordance to the first step in the process of this invention a 3,20-diketal of 9α-fluoro-11-ketoprogesterone (Compounds A), such as the 3,20-bis-ethylene ketal, is reacted with methyl lithium in the presence of excess methyl iodide to yield the corresponding 3,20-diketal of 11α-hydroxy-12-ketoprogesterone (Compounds B).

Compounds B are then either reacted with a strong base, such as an alkali metal hydroxide (e.g., potassium hydroxide) to yield the corresponding 3,20-diketal of 11-keto-12β-hydroxy-progesterone (Compounds D) or with lithium aluminum hydride to yield the corresponding 3,20-diketal of 11α,12α-dihydroxyprogesterone (Compounds C).

Compounds C are then reacted with a ketone or an aldehyde of at least two carbon atoms, the reaction preferably being carried out by treating a suspension or solution of the steroid in the ketone or aldehyde (or an organic solvent if the ketone or aldehyde is a solid) with an acid catalyst (e.g., perchloric acid, p-toluene sulfonic acid, and hydrochloric acid), neutralizing the acid and recovering the 11α,12α-cyclic ketal or acetal of 11α,12α-dihydroxyprogesterone (Compounds E) formed.

Compounds E may then be hydrolyzed to yield Compound H, which can then be reacetalized or reketalized by treatment with an aldehyde or ketone to yield Compounds E having different P and/or Q groups. Compounds H can also be formed by hydrolyzing Compounds C by treatment with a mineral acid.

Among the suitable ketones and aldehydes that can be used in this step of the processes of this invention may be mentioned the lower alkanals of at least two carbon atoms, such as paraldehyde, propanal, and hexanal; di(lower alkyl)ketones, such as acetone, diethylketone, dibutylketone, methylethylketone, and methylisobutyl-ketone; cycloalkanones, such as cyclobutanone, cyclopentanone, cyclohexanone, suberone, and cyclodexanone; mono and dicycloalkyl ketones, such as cyclohexylmethyl-ketone and dicyclopropylketone, halo-lower alkanals, such as chloral hydrate, trifluoroacetaldehyde hemiacetal, and heptafluorobutanal ethyl hemiacetal; halo-lower alkanones, such as 1,1,1-trifluoroacetone; monocyclic carbocyclic aromatic aldehydes, such as benzaldehyde, halobenzaldehydes (e.g., p-chlorobenzaldehyde and p-fluorobenzaldehyde), lower alkoxybenzaldehydes (e.g., o-anisaldehyde), di(lower alkoxy)benzaldehydes (e.g., veratraldehyde), hydroxybenzaldehydes (e.g., salicylaldehyde), dihydroxybenzaldehydes (e.g., resorcylaldehyde), lower alkyl benzaldehydes (e.g., m-tolualdehyde and p-ethylbenzaldehyde), di(lower alkyl)benzaldehydes (e.g., o, p-dimethyl-benzaldehyde), nitrobenzaldehydes, acyl-amidobenzaldehydes (e.g. N-acetylanthranilaldehyde), and cyanobenzaldehydes; monocyclic carbocyclic aromatic lower alkanals, such as phenylacetaldehyde, α-phenylpropionaldehyde, β-phenyl-propionaldehyde, γ-phenylbutyraldehyde, and aromatically-substituted halo, lower alkoxy, hydroxy, lower alkyl, nitro, acylamido and cyano derivatives thereof; monocyclic heterocyclic aldehydes, such as picolinaldehydes, furfural, thiophene carbonals, and halo, lower alkoxy, hydroxy, lower alkyl, nitro, and cyano derivatives thereof; monocyclic heterocyclic lower alkanals; 1-(monocyclic carbocyclic aromatic) substituted lower alkanals, such as acetophenone, α,α,α - trifluoroacetophenone, propiophenone, butyrophenone, valerophenone, isocaprophenone, halo-phenyl lower alkyl ketones (e.g., p-chloroacetophenone and p-chloropropiophenone), (lower alkoxy)phenyl lower alkyl ketones (e.g., p-anisyl methyl ketone), di(lower alkoxy) phenyl lower alkyl ketones, hydroxyphenyl lower alkyl ketones, dihydroxyphenyl lower alkyl ketones (e.g., resacetophenone), (lower alkyl)phenyl lower alkyl ketones (e.g., methyl p-tolyl ketone), di(lower alkyl) phenyl lower alkyl ketones (o,p-xylyl methyl ketone), nitrophenyl lower alkyl ketones (e.g., p-nitroacetophenone), acyl-amidophenyl lower alkyl ketones (e.g., acetyl anilines), and cyanophenyl lower alkyl ketones; benzophenone, and mono or bis substituted halo, lower alkoxy, hydroxy, lower alkyl, nitro, acylamido and cyano derivatives thereof; monocyclic carbocyclic aromatic lower alkanones, such as 1-phenyl-3-butanone and 1-phenyl-4-pentanone, and aromatically substituted derivatives thereof; 1-(monocyclic heterocyclic)- substituted lower alkanals, such as 2-acetylfuran, 2-benzoylfuran, and 2-acetylthiophene; oxo substituted monocyclic heterocyclics, such as alloxan; monocyclic heterocyclic lower alkanones, and oxo lower alkanoic acids such as glyoxylic, pyruvic, acetoacetic, β-ketopropionic, α-ketobutyric, levulinic, β-keto-caproic and β-ketocaprylic acid [as well as salts and esters thereof, such as the lower alkyl esters (e.g., methyl and ethyl)].

If a keto acid is employed as the acetalizing or ketalizing agent, although the free acid may be used as such, thereby directly yielding the free acid derivative, a preferred method for forming these derivatives is by an initial reaction with an ester of the desired ketoacid and subsequent hydrolysis of the ester derivative, as by treatment with a dilute mineral acid, to yield the free acid derivative. The free acid can then, if desired, by neutralized with any desired base (preferably ammonium hydroxide or an alkali metal hydroxide, such as sodium hydroxide and potassium hydroxide), to yield the salt derivative, or esterified by reaction with the desired alcohol (preferably a lower alkanol, such as methanol), in the usual manner, to yield an ester derivative, which differs from the initial ester reactant.

Compounds D, when reacted with lithium aluminum hydride, yield the corresponding diketal of 11β,12β-dihydroxyprogesterone (Compounds F), which are then reacted with a ketone or an aldehyde of at least two carbon atoms, such as one of the aldehydes or ketones mentioned hereinbefore, under the same conditions previously listed, to yield the corresponding 11β,12β-cyclic ketals and acetals of 11β,12β-dihydroxyprogesterone (Compounds G).

Compounds D can also be reacted with an alkali metal, such as sodium metal, to yield the corresponding 3,20-bis ketal of 11α,12β-dihydroxyprogesterone (Compound I) which can then be hydrolyzed, as by treatment with a mineral acid, such as sulfuric acid, to yield the free 11α,12β-dihydroxyprogesterone (Compound J). Reaction of Compound J with a ketone or an aldehyde of at least two carbon atoms, such as one of the aldehydes or ketones previously mentioned, under the same conditions previously listed, yields the corresponding 11α,12β-cyclic ketals and acetals of 11α,12β-dihydroxyprogesterone (Compounds K). Compounds K can also be prepared directly from Compounds I under the same conditions, the acid present serving to hydrolyze the 3,20-bis ketal groups.

Compounds G can be hydrolyzed to yield the free 11β,12β-dihydroxyprogesterone (Compound L). This compound can also be prepared by hydrolyzing Compounds F by treatment with a mineral acid, such as sulfuric acid.

11β,12α-dihydroxyprogesterone can be prepared by treating 11β,12β-oxidoprogesterone with perchloric acid. This compound, as well as all other compounds disclosed that contain a free 12α-hydroxy group, can then be esterified in the usual manner, by treatment with the acyl chloride or acid anhydride of the desired acid. The preferred acids are those of hydrocarbon carboxylic acids of less than twelve carbon atoms, as exemplified by the lower alkanoic acids, the aromatic carboxylic acids (e.g., benzoic acid), the aralkanoic acids (e.g., phenacetic and β-phenylpropionic acid), the cycloalkane carboxylic acids and the cycloalkene carboxylic acids.

If a 1-dehydroprogesterone derivative is desired, the resulting 11,12-oxygenated steroid (Compounds E, F, G, H, J, K, 11β,12α-dihydroxyprogesterone and esters of those compounds containing a 12α-hydroxy group) are treated with 2,3-dichloro-5,6-dicyanobenzoquinone, preferably at an elevated temperature, such as the reflux temperature of the solvent used to dissolve the steroid, to yield the corresponding 1-dehydro derivatives of the starting steroids.

In addition to Compounds E, G, H, J, K, L, 11β, 12α-dihydroxy-progesterone and esters of those compounds containing a 12α-hydroxy group, Compounds B, C and F are new intermediates of this invention.

The following examples illustrate the invention (all temperatures being in centigrade):

*Example 1.—$\Delta^5$-pregnene-11α-ol-3,12,20-trione 3,20-bis-ethylene ketal*

To 453 g. of lithium shot previously washed with three, two-liter portions of ether, 28 l. of anhydrous ether are added followed by 3.26 l. of methyl iodide which are added slowly at such a rate as to maintain a controlled reflux.

A solution of 1.405 kg. of 9α-fluoro-$\Delta^5$-pregnene-3,11,20-trione 3,20-bisethylene ketal in 14 l. of dry benzene is then added slowly with stirring so as to maintain the temperature at 26–36°. The reaction mixture is kept at 24° for 15 hours after which the excess reagent is destroyed by the careful addition of 4.1 of methanol, followed by 18 l. of water. The organic phase is separated, and the aqueous phase is extracted three times with 15 l. portions of benzene. The combined organic phases are then washed with water to pH 6.8, dried over sodium sulfate and concentrated, in vacuo. The crystals which separate are filtered, washed with warm hexane and dried to give about 674 g. of $\Delta^5$-pregnene-11α-ol-3,12,20-trione 3,20-bisethylene ketal having a melting point of about 224–226°, $[\alpha]_D^{22}$+2.90 (chf.).

*Example 2.—$\Delta^5$-pregnene-12β-ol-3,11,20-trione 3,20-bis-ethylene ketal*

To a solution of 50 g. of potassium hydroxide in a mixture of 875 ml. of methanol and 125 ml. of water, 5 g. of $\Delta^5$-pregnene-11α-ol-3,12,20-trione 3,20-bisethylene ketal are added and the mixture refluxed for 3 hours, during which time the steroid dissolves and the solution turns amber. The solution is then cooled, diluted with 2 liters of water and extracted with ethyl acetate. The ethyl acetate extracts are combined, washed with water until neutral, dried over sodium sulfate and evaporated to dryness, in vacuo. Crystallization of the residue from acetone gives about 3.56 g. of $\Delta^5$-pregnene-12β-ol-3,11,20-trione 3,20-bisethylene ketal having a melting point of about 186–188°.

*Example 3.—$\Delta^5$-pregnene-11β,12β-diol-3,20-dione 3,20-bisethylene ketal*

To a solution of 101.6 mg. of $\Delta^5$-pregnene-12β-ol-3,11,20-trione 3,20-bisethylene ketal in 25 ml. of tetrahydrofuran, freshly distilled from lithium aluminum hydride, 103.6 mg. of lithium aluminum hydride is added in small portions over a five-minute period. The mixture is then refluxed for three and one-half hours, cooled and the excess reagent decomposed by the careful addition of ethyl acetate. The mixture is then diluted with water, extracted with chloroform, the chloroform extracts combined, washed with water and evaporated to dryness, in vacuo. Crystallization of the residue from acetone-hexane gives about 72.3 mg. of $\Delta^5$-pregnene-11β,12β-diol-3,20-dione 3,20-bisethylene ketal having a melting point of about 208–210°, $[\alpha]_D^{22}$—35.3° (chf.).

Analysis.—Calcd. for $C_{25}H_{38}O_6$ (434.55): C, 69.09; H, 8.81. Found: C, 69.04; H, 8.84.

*Example 4.—$\Delta^5$-pregnene-11α,12α-diol-3,20-dione 3,20-bisethylene ketal*

To a solution of 1.0 g. of $\Delta^5$-pregnene-11α-ol-3,12,20-trione 3,20-bisethylene ketal in 75 ml. of tetrahydrofuran, freshly distilled from lithium aluminum hydride, 1.0 g. of lithium aluminum hydride is added in small portions over a five-minute period. Then, following the procedure of Example 3, there is obtained about 900 mg. of $\Delta^5$-pregnene-11α,12α-diol-3,20-dione 3,20-bisethyleneketal having a melting point of about 222–224°, $[\alpha]_D^{22}$—26.1° (chf.).

Analysis.—Calcd. for $C_{25}H_{28}O_6$ (434.55): C, 69.09; H, 8.81. Found: C, 69.03; H, 8.86.

Similarly, if 9α-fluoro-$\Delta^5$-pregnene-3,11,20-trione 3,20-bis-1,2-propylene ketal and 9α-fluoro-$\Delta^5$-pregnene-3,11,20-trione 3,20-bis-trimethylene ketal are substituted for the bisethylene ketal in the procedure of Example 1 and the procedures of Examples 2, 3 and 4 are followed, the corresponding 3,20-bis-1,2-propylene ketal and 3,20-bis-trimethylene ketal derivatives are obtained, respectively.

*Example 5.—11β,12β-dihydroxyprogesterone 11,12-acetonide*

A solution of 107 mg. of $\Delta^5$-pregnene-11β,12β-diol-3,20-dione 3,20-bisethylene ketal in 20 ml. of acetone containing 0.02 ml. of perchloric acid is kept at room temperature for 16 hours. It is then neutralized with dilute sodium bicarbonate solution, diluted with water and extracted with chloroform. The chloroform extracts are combined, washed with water and evaporated to dryness, in vacuo. Crystallization of the residue from acetone-hexane gives 11β,12β-*dihydroxy-progesterone* 11,12-*acetonide* having a melting point of about 224–226°, $[\alpha]_D^{22}$ +224° (chf.), $\lambda_{max}^{alc.}$ 238 mμ ($\epsilon$=17,000)

Analysis.—Calcd. for $C_{24}H_{34}O_4$ (386.51): C, 74.57; H, 8.87. Found: C, 74.64; H, 8.77.

Example 6.—11β,12β-dihydroxyprogesterone 11,12-acetophenonide

Following the procedure of Example 5 but substituting freshly distilled acetophenone for the acetone there is obtained 11β,12β-dihydroxyprogesterone 11,12-acetophenonide.

Similarly, if any of the other aldehydes or ketones specifically listed hereinbefore is substituted for the acetone in the procedure of Example 5, the corresponding 11,12-cylic acetal or ketal derivative of 11β,12β-dihydroxyprogesterone is obtained.

Example 7.—11α,12α-dihydroxyprogesterone 11,12-acetonide

A solution of 50 mg. of Δ$^5$-pregnene-11α,12α-diol-3,20-dione 3,20-bisethylene ketal in 10 ml. of acetone containing 0.01 ml. of perchloric acid is kept at room temperature for 18 hours. It is then diluted with water, neutralized with 5% sodium bicarbonate and extracted with chloroform. The chloroform is washed with water and evaporated to dryness, in vacuo, to give a residue which on crystallization from acetone-hexane gives about 30 mg. of 11α,12α-dihydroxyprogesterone 11,12-acetonide having a melting point of about 162–164°, $[\alpha]_D^{22}$ +88.9° (chf.).

*Analysis.*—Calcd. for $C_{24}H_{34}O_4$ (386.51): C, 74.57; H, 8.87. Found: C, 75.12; H, 9.08.

Example 8.—11α,12α-dihydroxyprogesterone 11,12-acetophenonide

A solution of 303 mg. of Δ$^5$-pregnene-11α,12α-diol-3,20-dione, 3,20-bisethylene ketal in 15 ml. of freshly distilled acetophenone containing 0.075 ml. of perchloric acid is left at room temperature for 68 hours. The reaction is then neutralized with 5% sodium bicarbonate, diluted with water and extracted with chloroform. The chloroform extracts are washed with water and evaporated to dryness, in vacuo. Chromatography of the residue on Woelm neutral alumina (Activity V) gives 11α,12α-dihydroxyprogesterone 11,12-acetophenonide.

Example 9.—11α,12α-dihydroxy-1-dehydroprogesterone 11,12-acetophenonide

A solution of 224 mg. of 11α,12α-dihydroxyprogesterone 11,12-acetophenonide and 125 mg. of 2,3-dichloro-5,6-dicyanoquinone in 10 ml. of purified dioxane is refluxed under nitrogen for 6 hours. The mixture is then filtered and the precipitate washed with dioxane. The combined filtrate and washing is then diluted with an equal volume of chloroform and adsorbed onto 10 g. of Woelm neutral alumina (Activity I). Elution with chloroform and evaporation of the solvent, in vacuo, gives a residue which on crystallization from acetone-hexane yields 11α,12α-dihydroxy-1-dehydroprogesterone 11,12-acetophenonide.

Example 10.—11β,12β-dihydroxy-1-dehydroprogesterone 11,12-acetophenonide

Following the procedure of Example 9 but substituting 11β,12β-dihydroxyprogesterone 11,12-acetophenonide for the 11α,12α-dihydroxyprogesterone 11,12-acetophenonide, 11β,12β-dihydroxy-1-dehydroprogesterone 11,12-acetophenonide is obtained.

Example 11.—11β,12α-dihydroxyprogesterone

To a solution of 200 mg. of 11β,12β-oxidoprogesterone in 3.5 ml. of dioxane 1.7 ml. of 2 molar perchloric acid are added and the solution left at room temperature for twenty four hours. The solution is then diluted with 25 ml. of water and extracted three times with chloroform. The combined chloroform extracts are washed with water and evaporated to dryness, in vacuo. The residue on crystallization from acetone-hexane gives about 158 mg. of 11β,12α-dihydroxyprogesterone having a melting point of about 180–181°, $[\alpha]_D^{22}$ +186° (chloroform), $$\lambda_{max}^{alc.}\ 242\ m\mu\ (\epsilon,\ 14{,}800)$$

*Analysis.*—Calcd. for $C_{21}H_{30}O_4$ (346.45): C, 72.80; H, 8.73. Found: C, 72.76; H, 8.73.

Example 12.—11β,12α-dihydroxyprogesterone 12-acetate

A solution of 25 mg. of 11β,12α-dihydroxyprogesterone in 3 ml. of dry pyridine and 1 ml. of acetic anhydride is kept at room temperature for sixteen hours. The solution is then diluted with ice water and extracted with chloroform. The chloroform extracts are washed with water, 2 N hydrochloric acid, and water again until neutral and evaporated to dryness, in vacuo. The residue is plate chromatographed using alumina (V) as adsorbent and chloroform as the developing solvent. The band having an Rf of 0.4 on detection by U.V. is eluted with ethyl acetate and on crystallization of the residue after evaporation of the solvent from acetone-hexane gives about 11.3 mg. of 11β,12α-dihydroxyprogesterone 12-acetate having a melting point of about 238–240°, $[\alpha]_D^{22}$ +203° (chloroform),

*Analysis.*—Calcd. for $C_{23}H_{32}O_5$ (388.49): C, 71.10; H, 8.30. Found: C, 70.91; H, 8.02.

Example 13.—3,20-bisethylenedioxy-5-pregnene-11α,12β-diol

Thirty grams of sodium metal are added in small portions to a refluxing solution of 3,20-bisethylenedioxy-5-pregnene-12β-ol-11-one in 500 ml. of n-butyl alcohol over a three hour period. The resulting solution is then refluxed for three hours during which time the sodium dissolved completely. The orange solution is then slowly diluted with 50 ml. of water whereupon crystals slowly separate. An additional 100 ml. of water are then added slowly and the mixture filtered and dried to give about 1.07 grams of 3,20-bisethylenedioxy-5-dehydropregnene-11α,12β-diol having a melting point about 185–187°, $[\alpha]_D^{27}$ −26.2° (chloroform).

*Analysis.*—Calcd. for $C_{25}H_{38}O_6$ (434.55): C, 69.09, H, 8.81. Found: C, 68.85; H. 8.63.

Example 14.—11α,12β-dihydroxyprogesterone

A solution of 100 mg of 3,20-bisethylenedioxy-5-pregnene-11α,12β-diol in 40 ml. of reagent grade methanol and 1.4 ml. of a solution of 8 ml. of sulfuric acid per 92 ml. of water is refluxed for 40 minutes. The solution is then cooled, neutralized carefully with 5% sodium bicarbonate, diluted with 80 ml. of water and extracted with chloroform. The chloroform extract is washed with water until neutral and evaporated to dryness, in vacuo. Crystallization of the residue from acetone-hexane gives about 54.3 mg. of 11α,12β-dihydroxyprogesterone having a melting point of about 152–154° $[\alpha]_D^{27}$ +108° (chloroform), $$\lambda_{max}^{alc.}\ 241\ m\mu\ (\epsilon,\ 14{,}600)$$

*Analysis.*—Calcd. for $C_{21}H_{30}O_4$ (346.45): C, 72.80; H, 8.73. Found: C, 72.71; H, 8.88.

Example 15.—11α,12β-dihydroxyprogesterone 11,12-acetonide

A solution of 700 mg. of 3,20-bisethylenedioxy-5-pregnene-11α,12β-diol in 100 ml. of reagent grade acetone containing 0.1 ml. of perchloric acid is kept at room temperature for eighteen hours. It is then neutralized with 5% sodium bicarbonate and diluted carefully with water whereupon crystals separate. The crystals are filtered, washed with water, dried to give 11α,12β-dihydroxyprogesterone 11,12-acetonide having a melting point of about 199–201°, [α]$_D^{22}$ +222° (chloroform), $\lambda_{max}^{alc.}$ 239 mμ (ε, 16,000)

Example 16.—11α,12β-dihydroxyprogesterone 11,12-acetonide

Following the procedure of Example 15 but substituting 11α,12β-dihydroxyprogesterone for the 3,20-bisethylenedioxy-5-pregnene-11α,12β-diol there is obtained 11α,12β-dihydroxyprogesterone 11,12-acetonide.

Example 17.—11α,12β-dihydroxyprogesterone 11,12-acetophenonide

Following the procedure of Example 15 or 16 but substituting acetophenone for the acetone there is obtained 11α,12β-dihydroxyprogesterone 11,12-acetophenonide.

Example 18.—11α,12α-dihydroxyprogesterone

A solution of 500 mg. of 3,20-bisethylenedioxy-5-pregnene-11α,12α-diol in 200 ml. of reagent grade methanol and 7 ml. of a solution of 8 ml. of sulfuric acid in 92 ml. of water is refluxed for forty minutes. It is then cooled, neutralized carefully with 5% sodium bicarbonate, diluted with water and extracted with chloroform. The chloroform extract is then washed with water and evaporated to dryness, in vacuo. The residue on plate chromatography using alumina (V) as adsorbant and chloroform-ethyl acetate (4:1;v:v) as developing solvent gives a band at R$f$ 0.5 detectable by U.V. which on separation and elution with ethyl acetate gives a residue which on crystallization from acetone-hexane yields about 150 mg. of 11α,12α-dihydroxyprogesterone having a melting point of 158–160°, [α]$_D^{27}$ +142° (chloroform), $\lambda_{max}^{alc.}$ 242 mμ (ε, 16,100)

*Analysis.*—Calcd. for $C_{21}H_{30}O_4$ (346.45): C, 72.80; H, 8.73. Found: C, 72.86; H, 8.76.

Example 19.—11β,12β-dihydroxyprogesterone

Following the procedure of Example 18 but substituting 3,20-bisethylenedioxy-5-pregnene-11β,12β-diol for the 3,20-bisethylenedioxy-5-pregnene-11α,12α-diol there is obtained 11β,12β-dihydroxyprogesterone having melting point about 188–189°, [α]$_D^{26}$ +116° (chloroform), $\lambda_{max}^{alc.}$ 240 mμ (ε, 17,800)

*Analysis*—Calcd. for $C_{21}H_{30}O_4$ (346.45): C, 72.80; H, 8.73. Found: C, 72.74; H, 8.82.

The invention may be variously otherwise embodied within the scope of the appended claims.

What is claimed is:
1. A compound selected from the group consisting of steroids of the formulae

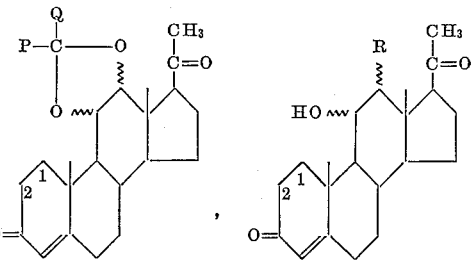

and the 1,2-dehydro derivatives thereof, wherein R is selected from the group consisting of hydroxy and α-acyloxy, P is selected from the group consisting of hydrogen, lower alkyl, halo lower alkyl, carboxy lower alkyl, monocyclic cycloalkyl, monocyclic aryl, monocyclic aryl lower alkyl, monocyclic heterocyclic and monocyclic heterocylic lower alkyl, Q is selected from the group consisting of lower alkyl, halo lower alkyl, carboxy lower alkyl, monocyclic, cycloalkyl, monocyclic aryl, monocyclic aryl lower alkyl, monocyclic heterocyclic and monocyclic heterocyclic lower alkyl, and together with the carbon atom to which they are joined, P and Q are selected from the group consisting of cycloalkyl and monocyclic heterocyclic.

2. 11β,12β-lower alkylidenedioxyprogesterone.
3. 11β,12β-dihydroxyprogesterone 11,12-acetonide.
4. 11β,12β - dihydroxyprogesterone 11,12 - acetophenonide.
5. 11β,12β-dihydroxy-1-dehydroprogesterone 11,12-acetophenonide.
6. 11α,12α-lower alkylidenedioxyprogesterone.
7. 11α,12α-dihydroxyprogesterone 11,12-acetonide.
8. 11α,12α - dihydroxyprogesterone, 11,12 - acetophenonide.
9. 11α,12α-dihydroxy-1-dehydroprogesterone 11,12-acetophenonide.
10. The 3,20-bis-lower alkylene ketal of 11α,12α-dihydroxyprogesterone.
11. The 3,20-bis-ethylene ketal of 11α,12α-dihydroxyprogesterone.
12. The 3,20-bis-lower alkylene ketal of 11β,12β-dihydroxyprogesterone.
13. The 3,20-bis-ethylene ketal of 11β,12β-dihydroxyprogesterone.
14. 11β,12α-dihydroxyprogesterone.
15. 11α,12β-dihydroxyprogesterone.
16. 11α,12β-lower alkylidenedioxyprogesterone.
17. 11α,12α-dihydroxyprogesterone.
18. 11β,12β-dihydroxyprogesterone.

References Cited by the Examiner
UNITED STATES PATENTS 2,751,400  6/1956  Nathan _____ 260—397.45
3,056,731  10/1962  Isono et al. _____260—397.45
3,185,713  5/1965  Becker et al. _____ 260—397.3

LEWIS GOTTS, *Primary Examiner.*

JOHNNIE R. BROWN, *Assistant Examiner.*